No. 717,882. PATENTED JAN. 6, 1903.
J. C. MARTIN, Jr.
BALL AND SOCKET JOINT.
APPLICATION FILED AUG. 21, 1902.
NO MODEL.

Witnesses:

Inventor:
Jesse C. Martin Jr.,
By Dyrenforth, Dyrenforth my See,
Atty's

UNITED STATES PATENT OFFICE.

JESSE C. MARTIN, JR., OF SAN FRANCISCO, CALIFORNIA, ASSIGNOR TO THE HOLLAND COMPANY, OF CHICAGO, ILLINOIS, A CORPORATION OF ILLINOIS.

BALL-AND-SOCKET JOINT.

SPECIFICATION forming part of Letters Patent No. 717,882, dated January 6, 1903.

Application filed August 21, 1902. Serial No. 120,480. (No model.)

*To all whom it may concern:*

Be it known that I, JESSE C. MARTIN, Jr., a citizen of the United States, residing at San Francisco, in the county of San Francisco and State of California, have invented a new and useful Improvement in Ball-and-Socket Joints, of which the following is a specification.

My invention relates to an improvement in the class of ball-and-socket pipe-joints; and my object is to provide an improved construction of joint in the class referred to, whereby its durability shall be greatly enhanced without materially increasing the cost of manufacture over the simpler forms of such joints now in common use.

Figure 1:
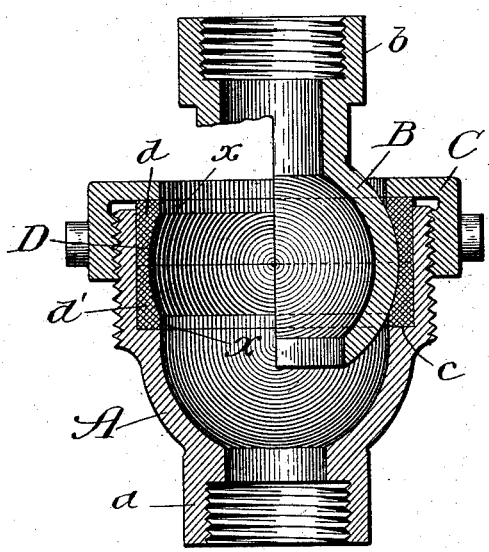
Figure 2:
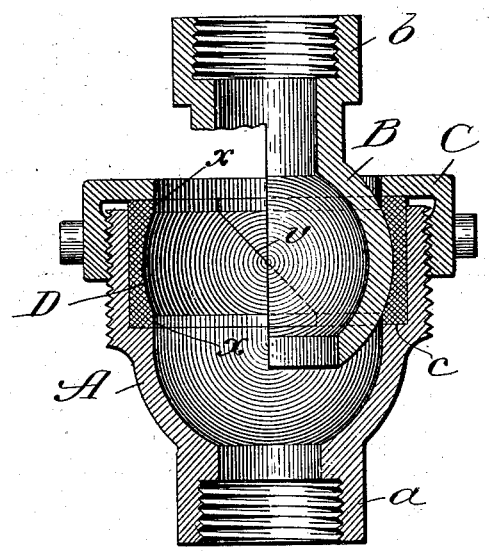
Figure 3:
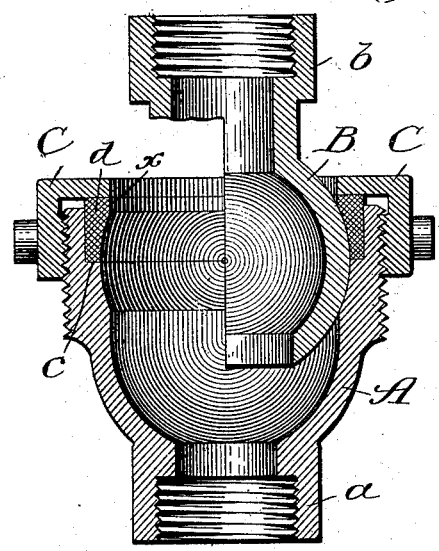

Referring to the accompanying drawings, Figure 1 is a longitudinal section of a ball-and-socket joint embodying my improvement in its preferred form; Fig. 2, a similar view of the same, showing my improvement in a modified form; Fig. 3, a similar view of the same, showing my improvement in another modified form; and Fig. 4, a similar view of the same, showing still another modification of my improvement.

In each figure of the drawings one-half of the section of the ball member of the joint is cut away to prevent it from obstructing the view of features which it is desired to disclose.

A is the socket, terminating in a threaded nipple $a$ for coupling it to a pipe, and threaded about its mouth for securing upon it the annular cap or nut C to secure against withdrawal from the socket the hollow ball B, which terminates in a threaded nipple $b$ for the attachment of a pipe.

All the parts thus far referred to may be of ordinary general construction.

Within the socket A is formed about its wall a shoulder $c$, affording the seat for a gasket D, which constitutes the feature of my improvement. It is essentially composed of a hard non-metallic substance or composition, such as the composition of rubber and asbestos, known by the name "vulcabestin," or other hardened fiber material, and preferably of vulcanite. Any of the materials referred to for the gasket adapt it to be formed by molding, which is the preferable method of its formation, since it permits uniformity in the product and accuracy in the details, besides being the least expensive. The internal surface of the annular gasket is of the shape of the section it surrounds of the ball B to conform accurately to the contour of the latter, its outer surface is straight in cross-section to fit about the annular wall extending from the shoulder $c$, and its extreme edges are straight across to conform to the shoulder against which it seats about one of said edges. The outer edge of the gasket is preferably squared, as shown at $x$, to aline with the inner circumference of the annular portion of the cap C and subserve a purpose hereinafter explained. The gasket constitutes a non-metallic lining between the inner wall of the socket A and the ball B to prevent the abrading contact of the metal surfaces of these two members of the joint, and thus accomplish my primary object of increasing its durability. As shown in Fig. 1, the gasket is formed of two similar annular sections $d$ and $d'$, fitting the contour of the ball B, one section seating against the shoulder $c$ and the other abutting circumferentially against its outermost edge, being held tightly in such abutment by the cap or nut C. In the use of the joint (which is especially designed for flexibly coupling steam, air, and water pipes, though not intended to be limited to these particular uses) there is obviously no appreciable wear on the inner gasket-section $d'$ or portion of the gasket extending inward from its circumferential center. Hence, as will be observed, when the outer section $d$ becomes worn to a degree of thinness which renders it unfit or undesirable for further use its place may be taken by the lower section $d'$, adjusted in reverse position to that in which it is shown in Fig. 1, and the worn section $d$ may be relegated to the place shown to be occupied by the section $d'$, but in reverse position. Thus the durability of the joint, already great, owing to the character of material forming the gasket, is rendered much greater by the double wearing-surface afforded by its reversibility, and regarding the particular advantage of the construction shown in Fig. 1 from another point of view it may be considered as affording means ready at hand for conveniently repairing the joint when worn, such means comprising the inner reversible gasket-section.

As shown in Fig. 2, the gasket D is undivided circumferentially, being of the full width of the two sections $d$ and $d'$ of the construction illustrated in Fig. 1, and a diagonal line is shown at $v$ to indicate that the ring is split, as it may be when split at all, in two diametrically opposite places to divide it into two separable half-circle sections to adapt the gasket to be adjusted in place or withdrawn, when necessary, on disconnecting the joint without to that end requiring the pipes connected by the joint to be uncoupled. In any of the forms of providing the gasket D represented in the drawings this described separable-section construction may be employed, if desired. The double-width form of the gasket represented in Fig. 2 is reversible with the same advantage as already described with reference to Fig. 1—namely, of enabling the unworn surface of the inner circumferential half of the gasket to be presented as a new wearing-surface to the ball in the place of the worn surface.

It is within my invention to provide the gasket D in the form represented in Fig. 3—that is, composed of only one section, like the section $d$ of Fig. 1, with the omission, however, of the advantage incidental to the previously-described forms of reversibility and the requirement that the gasket-seating shoulder $c$ be formed accordingly at a lesser depth within the socket.

Figure 4:
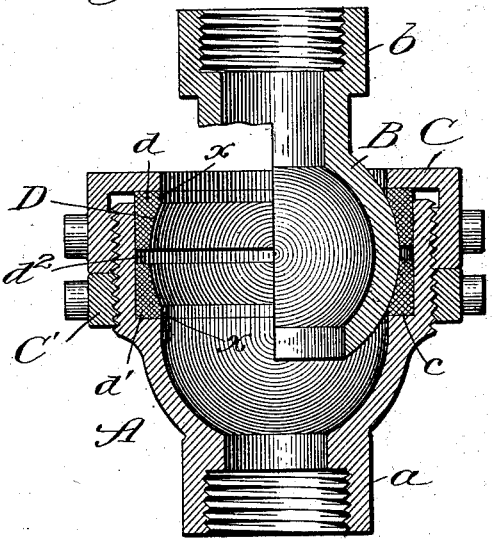

The construction represented in Fig. 4 as to the gasket D presents the advantages of that shown in Fig. 1 and is like the latter, except that the sections $d$ and $d'$ do not originally abut, but are separated by an annular space $d^2$, whereby as the inner surface of the section $d$ becomes worn that section may be forced inward by tightening the nut C to cause it always to bear the same relation to the ball until the gasket-sections eventually abut, when further adjustment of the worn section is arrested.

With the last-described construction of the gasket it is desirable to provide a lock-nut $C'$ about the socket A, adjustable to cause it to contact with the cap-nut C when tightened in taking up wear on the gasket-section $d$.

In each of the described constructions the squared outer edge portion $x$ of the gasket presents an advantageous feature by affording a cylindrical extension beyond the concave inner surface, which materially augments the wearing-surface of the gasket, since the wear may extend in its concavity through to the inner corner of the flat outer edge and nearly to the outer surface of the annulus until the latter becomes worn too thin for use.

What I claim as new, and desire to secure by Letters Patent, is—

1. In a ball-and-socket joint, the combination with a cap-carrying socket and the ball confined therein, of a reversible gasket having a concave inner surface affording a wearing-surface between the socket-wall and ball and having cylindrical inner surfaces joining the concave surface for the purpose specified.

2. In a ball-and-socket joint, the combination with a cap-carrying socket having a recess, and the ball confined therein, of a gasket formed of two similar annular sections interchangeably seated in said recess.

3. In a ball-and-socket joint, the combination with a cap-carrying socket having a recess, and the ball confined therein, of a hard non-metallic gasket formed of two similar annular sections interchangeably seated in said recess, each of said sections provided with a cylindrical inner surface joining a concave inner wearing-surface.

JESSE C. MARTIN, JR.

In presence of—
L. HEISLAR,
WM. B. DAVIES.